United States Patent
Bhat

(10) Patent No.: US 9,497,507 B2
(45) Date of Patent: Nov. 15, 2016

(54) ADVERTISEMENT INSERTION

(71) Applicant: General Instrument Corporation, Horsham, PA (US)

(72) Inventor: Dinkar N Bhat, Princeton, NJ (US)

(73) Assignee: ARRIS Enterprises, Inc., Suwanee, GA (US)

( * ) Notice: Subject to any disclaimer, the term of this patent is extended or adjusted under 35 U.S.C. 154(b) by 452 days.

(21) Appl. No.: 13/827,668

(22) Filed: Mar. 14, 2013

(65) Prior Publication Data

US 2014/0282692 A1 Sep. 18, 2014

(51) Int. Cl.
*H04N 7/10* (2006.01)
*H04N 7/025* (2006.01)
*H04N 21/458* (2011.01)
*H04N 21/234* (2011.01)
*H04N 21/81* (2011.01)

(52) U.S. Cl.
CPC ...... *H04N 21/458* (2013.01); *H04N 21/23418* (2013.01); *H04N 21/23424* (2013.01); *H04N 21/812* (2013.01)

(58) Field of Classification Search
CPC ..................... H04N 21/458; H04N 21/23418; H04N 21/23424; H04N 21/812; H04N 5/2723; G06Q 30/0241; G06Q 30/0242; G06Q 30/0251; G06Q 30/0271; G06Q 30/0269
See application file for complete search history.

(56) References Cited

U.S. PATENT DOCUMENTS

| | | | |
|---|---|---|---|
| 2007/0055983 A1 | 3/2007 | Schiller et al. | |
| 2007/0064739 A1* | 3/2007 | Krishnamachari | 370/486 |
| 2007/0250901 A1* | 10/2007 | McIntire et al. | 725/146 |
| 2008/0109391 A1* | 5/2008 | Chan | 706/45 |
| 2008/0120646 A1 | 5/2008 | Stern et al. | |
| 2008/0189735 A1* | 8/2008 | Barton et al. | 725/32 |
| 2008/0195468 A1* | 8/2008 | Malik | 705/14 |
| 2009/0063279 A1 | 3/2009 | Ives et al. | |
| 2010/0332329 A1 | 12/2010 | Roberts et al. | |
| 2012/0143693 A1 | 6/2012 | Chung et al. | |

FOREIGN PATENT DOCUMENTS

| | | |
|---|---|---|
| WO | 2009/032993 A2 | 3/2009 |
| WO | 2010/078650 A1 | 7/2010 |

OTHER PUBLICATIONS

PCT Search Report & Written Opinion, Re: Application No. PCT/US2014/025127, dated Dec. 10, 2014.
Official Action, Re: Korean Application No. 10-2015-7024809, dated Jun. 21, 2016.

* cited by examiner

*Primary Examiner* — Ngoc Vu
(74) *Attorney, Agent, or Firm* — Stewart M. Wiener

(57) ABSTRACT

A method implemented in a computer system for inserting advertisements into an audio/video stream. The method receives the audio/video stream, and monitors it to detect an advertisement insertion notification for the audio/video stream. The advertisement insertion notification references an advertisement insertion point at a position in the audio/video stream. The method determines a disposition of the audio/video stream at the position, and examines at least one advertisement stream to identify a matching advertisement stream having an advertisement disposition that agrees with the disposition of the audio/video stream at the position. The method inserts the matching advertisement stream into the audio/video stream at the position.

21 Claims, 3 Drawing Sheets

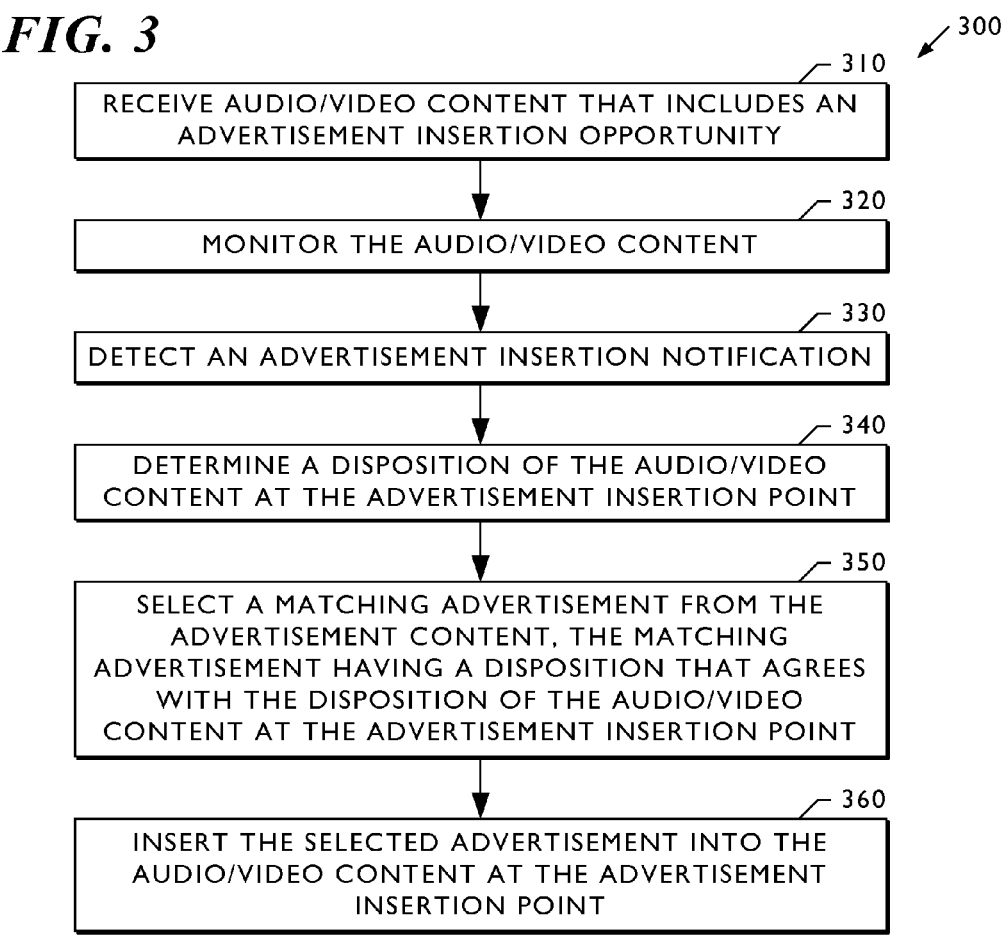

ADVERTISEMENT INSERTION

BACKGROUND

A multiple system operator (MSO) delivers audio/video content to its subscribers. The audio/video content includes, for example, television programs, multimedia services, and advertisements. The MSO delivers the audio/video content to its subscribers in an industry-standard format, for example, the Moving Picture Experts Group (MPEG) MPEG-2 transport stream format.

The Society of Cable Telecommunications Engineers (SCTE) develops technology standards related to cable telecommunications engineering. The SCTE 35 standard defines the splicing of an MPEG-2 transport stream for the purpose of digital program insertion. The SCTE 35 standard also defines the messages and structure that allow the MSO to splice, or insert, advertisements and other digital program content into the audio/video content.

BRIEF DESCRIPTION OF THE DRAWINGS

FIG. 3 is a flow diagram that illustrates one embodiment of a method performed by the advertisement insertion system shown in FIG. 1.

DETAILED DESCRIPTION

The MSO uses an advertisement server, typically including advertisement decision manager (ADM) software and advertisement decision service (ADS) software, to select and insert advertisements into the audio/video content stream for the subscriber. Conventional advertisement server solutions insert broadcast advertisement content into the audio/video content stream for delivery to every MSO subscriber. A current focus for the MSO is the development of targeted advertising technology for the advertisement server. The targeted advertising technology selects advertisements that target a particular consumer group for insertion into the audio/video content stream. Conventional targeted advertising solutions base the selection of the targeted advertisements on personal demographic and psychographic data associated with the subscriber. Other conventional targeted advertising solutions base the selection of the targeted advertisements on personal preferences, purchase history, and observed behaviors that the subscriber establishes.

"Disposition," as used herein, describes a mood or emotional state associated with audio/video content; for example, a mood or emotional state that the audio/video content would be likely to convey to a consumer or viewer. The conventional advertisement server and the conventional targeted advertising solutions both overlook the disposition of the main audio/video content when selecting the advertisement content. This shortcoming creates a discontinuity between the subscriber's impression of the main audio/video content and the advertisement content. The discontinuity at times can be quite jarring, for example, when the main audio/video content is news coverage of a natural disaster such as a tragic tsunami, and the advertisement content is a fun-filled advertisement for a soda producer.

Figure 1:
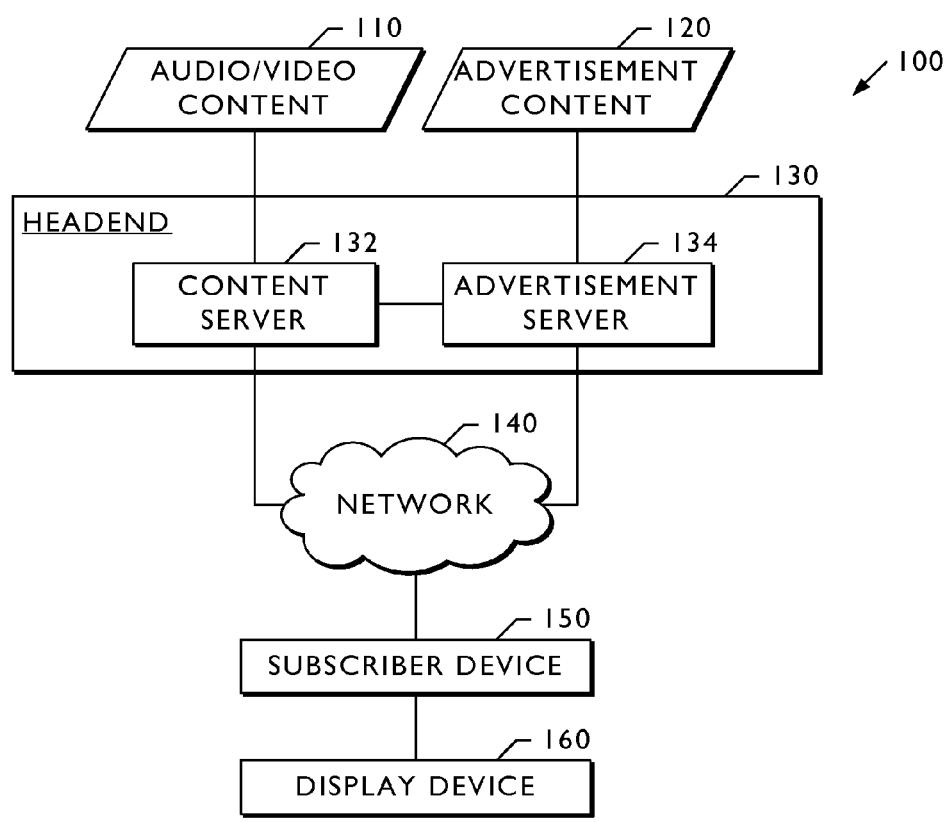
FIG. 1 is a block diagram that illustrates one embodiment of the hardware components of an advertisement insertion system.

FIG. 1 is a block diagram that illustrates one embodiment of the hardware components of an advertisement insertion system 100. The headend 130 is a master facility for the MSO that receives the audio/video content 110 and advertisement content 120. A network 140 connects the headend 130 to a subscriber device 150 that receives the audio/video content 110 and advertisement content 120. The subscriber device 150 connects to a display device 160 to display the audio/video content 110 and advertisement content 120 provided by the headend 130.

The headend 130 includes a content server 132 and an advertisement server 134. The content server 132 receives the audio/video content 110 generated from external television signals. The advertisement server 134 receives the advertisement content 120 from external content sources.

When the headend 130 performs the advertisement insertion, the advertisement server 134 communicates with the content server 132 to provide the advertisement content 120 that the content server 132 inserts into the audio/video content 110. The content server 132 inserts the advertisement content 120 into the audio/video content 110, and provides the combined content stream to the subscriber device 150. In various embodiments, the advertisement content 120 that the headend 130 inserts into the audio/video content 110 includes broadcast advertisement content, and targeted advertisement content.

The network 140 is a data and video content network providing two-way communication between the headend 130 to the subscriber device 150. The downstream communication path is from the headend 130 to the subscriber device 150. The upstream communication path is from the subscriber device 150 to the headend 130. In one embodiment, the network 140 is a hybrid-fiber coaxial (HFC) broadband network that combines optical fiber and coaxial cable that the MSO uses to deliver television programming and network services to a subscriber's premises. In another embodiment, the network 140 is a local area network that combines wired and wireless technology to distribute the high-definition television programming and network services from the MSO to the subscriber device 150.

The subscriber device 150 is a computing device, such as a set top box, personal computer, entertainment device, or digital media server. When the headend 130 performs the advertisement insertion, the subscriber device 150 receives a media stream that combines the audio/video content 110 and the advertisement content 120 from the headend 130. The subscriber device 150 connects to the display device 160 that displays the media stream on the display device 160. The display device 160 is a hardware device such as a high-definition television, or personal computer display. Even though FIG. 1 shows the subscriber device 150 and display device 160 as separate components, one skilled in the art will understand that the subscriber device 150 and the display device 160 may be a single integrated component.

When the subscriber device 150 performs the advertisement insertion, the subscriber device 150 receives the audio/video content 110 from the content server 132, and the advertisement content 120 from the advertisement server 134. The subscriber device 150 stores the advertisement content 120 in its local data storage. The subscriber device 150 also includes a targeted advertisement manager program that functions similar to the content server 132 and advertisement server 134 at the headend 130. When the targeted advertisement manager detects a splice point in the audio/video content 110, it selects from the advertisement content 120 in its local data storage based on selection criteria set by a subscriber associated with the subscriber device 150, and inserts the selected advertisement at the splice point. In another embodiment, the advertisement content 120 is not resident in the subscriber device 150, but instead is in a gateway device (not shown) that is accessible to the subscriber device 150 via a local network (not shown) for the subscriber.

In another embodiment, the subscriber device 150 is a digital video recorder (DVR) that the subscriber uses for time-delayed viewing of the audio/video content 110 and advertisement content 120. When the DVR performs the advertisement insertion, it retrieves the audio/video content 110 and advertisement content 120 from its local data storage.

In yet another embodiment, the subscriber device 150 receives the audio/video content 110 and advertisement content 120 from a web server (not shown) that connects to the subscriber device 150 via the Internet. When the web server performs the advertisement insertion, the subscriber device 150 receives a media stream that combines the audio/video content 110 and the advertisement content 120 from the web server. When the subscriber device 150 performs the advertisement insertion, the subscriber device 150 receives the audio/video content 110, and the advertisement content 120 from the web server.

The advertisement insertion system 100, as shown in FIG. 1 and described above, performs the advertisement insertion at the headend 130 or at the subscriber device 150. One skilled in the art will understand that it is also feasible to perform advertisement insertion at the headend 130 for broadcast advertisement content, and at the subscriber device 150 for targeted advertisement content.

Figure 2:
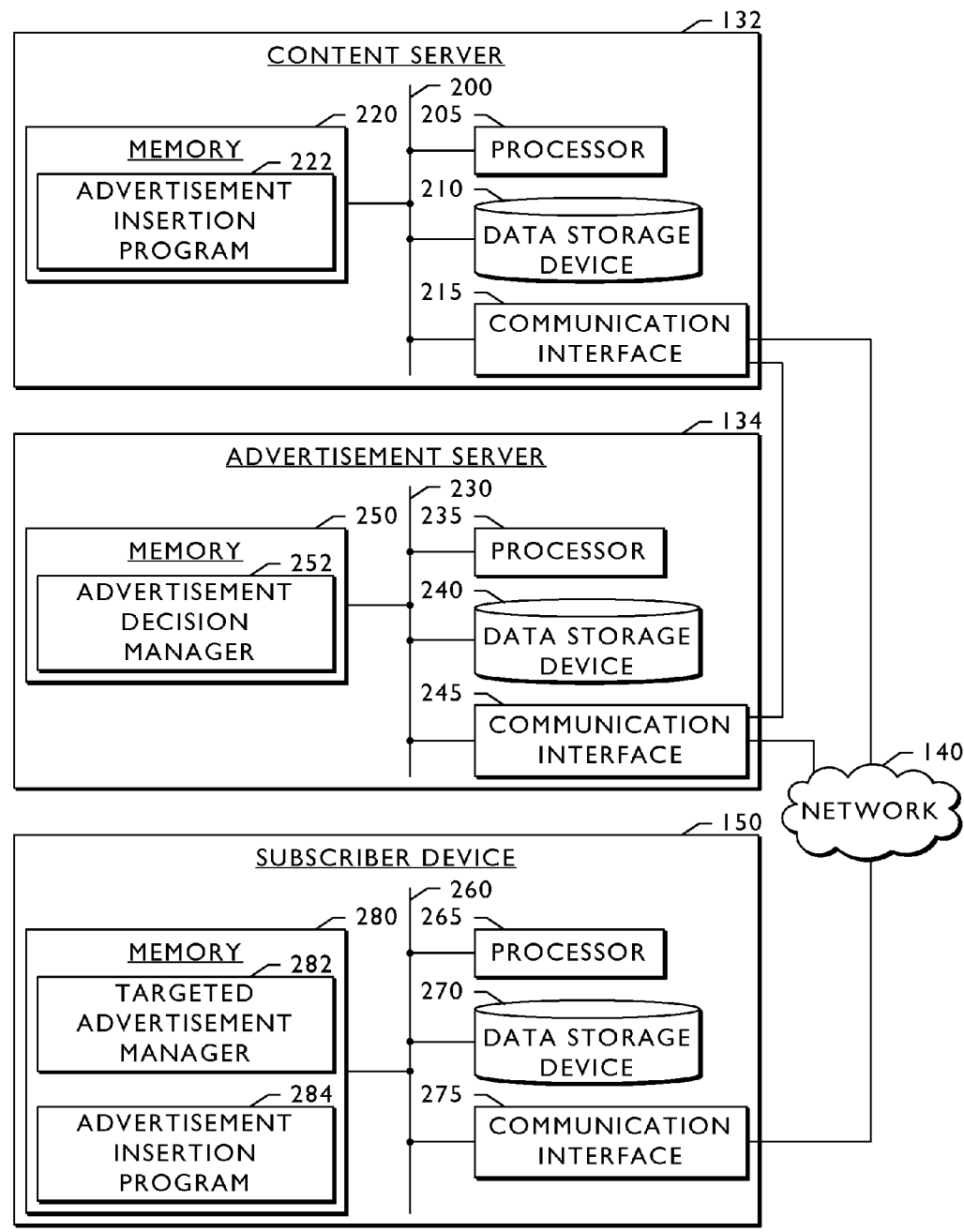
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. Specifically, FIG. 2 illustrates, in detail, one embodiment of the content server 132, advertisement server 134, and subscriber device 150.

The content server 132 shown in FIG. 2 is a general-purpose computer. A bus 200 is a communication medium connecting a processor 205, data storage device 210 (such as a serial ATA (SATA) hard disk drive, optical drive, small computer system interface (SCSI) disk, flash memory, or the like), communication interface 215, and memory 220 (such as random access memory (RAM), dynamic RAM (DRAM), non-volatile computer memory, flash memory, or the like). The communication interface 215 allows for two-way communication of data and content between the content server 132 and advertisement server 134, and between the content server 132 and subscriber device 150 via the network 140.

The processor 205 of the content server 132 performs the disclosed methods by executing sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the content server 132 includes an advertisement insertion program 222. The advertisement insertion program 222 performs advertising insertion; e.g., by performing the method disclosed in the embodiment depicted in FIG. 3. When the processor 205 performs the disclosed method, it stores intermediate results in the memory 220 or data storage device 210. In another embodiment, the processor 205 may swap these programs, or portions thereof, in and out of the memory 220 as needed, and thus may include fewer than all of these programs at any one time.

The advertisement server 134 shown in FIG. 2 is a general-purpose computer. A bus 230 is a communication medium connecting a processor 235, data storage device 240 (such as a serial ATA (SATA) hard disk drive, optical drive, small computer system interface (SCSI) disk, flash memory, or the like), communication interface 245, and memory 250 (such as random access memory (RAM), dynamic RAM (DRAM), non-volatile computer memory, flash memory, or the like). The communication interface 245 allows for two-way communication of data and content between the advertisement server 134 and content server 132, and between the advertisement server 134 and subscriber device 150 via the network 140.

The processor 235 of the advertisement server 134 performs the disclosed methods by executing sequences of operational instructions that comprise each computer program resident in, or operative on, the memory 250. The reader should understand that the memory 250 may include operating system, administrative, and database programs that support the programs disclosed in this application. In one embodiment, the configuration of the memory 250 of the advertisement server 134 includes an advertisement decision manager 252. The advertisement decision manager 252 performs the method disclosed in the illustrative embodiment depicted in FIG. 3. When the processor 235 performs the disclosed method, it stores intermediate results in the memory 250 or data storage device 240. In another embodiment, the processor 235 may swap these programs, or portions thereof, in and out of the memory 250 as needed, and thus may include fewer than all of these programs at any one time.

The subscriber device 150 shown in FIG. 2 is a general-purpose computer. A bus 260 is a communication medium connecting a processor 265, data storage device 270 (such as a serial ATA (SATA) hard disk drive, optical drive, small computer system interface (SCSI) disk, flash memory, or the like), communication interface 275, and memory 280 (such as random access memory (RAM), dynamic RAM (DRAM), non-volatile computer memory, flash memory, or the like). The communication interface 275 allows for two-way communication of data and content between the subscriber device 150, content server 132, and advertisement server 134 via the network 140.

The processor 265 of the subscriber device 150 performs the disclosed methods by executing sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the subscriber device 150 includes a targeted advertisement manager 282, and advertisement insertion program 284. The targeted advertisement manager 282 and advertisement insertion program 284 perform the method disclosed in the illustrative embodiment depicted in FIG. 3. When the processor 265 performs the disclosed method, it stores intermediate results in the memory 280 or data storage device 270. In another embodiment, the processor 265 may swap these programs, or portions thereof, in and out of the memory 280 as needed, and thus may include fewer than all of these programs at any one time.

FIG. 3 is a flow diagram that illustrates one embodiment of a method performed by the advertisement insertion system shown in FIG. 1. The process 300, with reference to FIG. 1 and FIG. 2, begins when the content server 132 on the headend 130 receives audio/video content 110 that includes an advertisement insertion opportunity (step 310). In one embodiment, the audio/video content 110 is an MPEG-2 transport stream and the advertisement insertion opportunity is an SCTE splice point.

The content server 132 monitors the audio/video content (step 320) to detect an advertisement insertion notification (step 330). In one embodiment, the advertisement insertion notification is an SCTE splice point notification message. The advertisement insertion program 222 determines a disposition of the audio/video content 110 at the advertisement insertion point (step 340). In one embodiment, the content server 132 determines the disposition from the closest point, or time, in the audio/video content 110. In another embodiment, the content server 132 determines the disposition from the audio/video content 110 segment that precedes the advertisement insertion point. In yet another embodiment, the content server 132 determines the disposition from the audio/video content 110 segment that follows the advertisement insertion point. In yet another embodiment, the content server 132 determines the disposition from the audio/video content 110 segment that precedes and follows the advertisement insertion point. In some embodiments, the disposition is provided (e.g., in a disposition indicator) for the audio/video content 110 in its entirety. In further embodiments, the disposition may vary over the duration of the audio/video content 110, and accordingly a disposition can be provided for each of one or more segments of the audio/video content 110.

The advertisement insertion program 222 on the content server 132 communicates with the advertisement server 134 to provide the disposition of the audio/video content 110 at the advertisement insertion point. The advertisement server 134 determines the disposition of each advertisement in the advertisement content 120, and compares the disposition of each advertisement in the advertisement content 120 to the disposition of the audio/video content 110 at the advertisement insertion point. The advertisement server 134 selects a matching advertisement from the advertisements in the advertisement content 120, where the matching advertisement has a disposition that agrees with the disposition of the audio/video content 110 at the advertisement insertion point (step 350). The advertisement server 134 sends the matching advertisement to the content server 132. The content server 132 inserts the matching advertisement into the audio/video content 110 at the advertisement insertion point (step 360).

The advertisement insertion program 222 on the content server 132 determines the disposition of the audio/video content 110 at the advertisement insertion point by retrieving a disposition indicator associated with the audio/video content 110. The implementation of the disposition indicator in the audio/video content 110 is independent of the encoding format for the audio/video content 110. In one embodiment, the implementation of the disposition indicator is a field in electronic program guide data for the program associated with the audio/video content 110 segment. In another embodiment, the implementation of the disposition indicator is a field included in the Program Specific Information (PSI), which is metadata about the program that is carried as part of an MPEG transport stream. For example, an MPEG-2 audio/video content transport stream may implement the disposition indicator as a program-level descriptor in the Program Map Table (PMT) of the PSI.

The disposition indicator inserted in the audio/video content 110 and advertisement content 120 segments both have a discrete value. In one illustrative example of an embodiment, the disposition indicator value represents a mood, such as "Happy", "Sad", and "Indifferent". It will be understood that the disposition values are not limited to moods such as "Happy", "Sad", and "Indifferent", and a wide variety of possible disposition values will be apparent to one skilled in the art. Illustrative examples of other, or additional, disposition values that may be applicable to an advertisement or an audio/video content 110 include "Romantic", "Sexy", "Silly", "Humorous", and the like.

If the audio/video content 110 is an MPEG-2 transport stream segment, an illustrative example of syntax for a disposition_indicator inserted in the PMT is:

| disposition_indicator_descriptor ( ) | |
|---|---|
| { | |
| descriptor_type | 8-bits |
| descriptor_length | 8-bits |
| disposition_indicator | 2-bits |
| reserved | 8-bits |
| } | |

During the time of advertisement insertion either at the headend 130 or subscriber device 150, the advertisement insertion program 222 checks the disposition_indicator of the audio/video content 110 (e.g., by examining the Program Guide or PMT). The advertisement insertion program 222 selects the advertisement that is the best match for the disposition, and inserts the selected advertisement. In one embodiment, the implementation of the selection and matching functions by the advertisement insertion program 222 stores a table, such as a lookup table, that it uses to compare the audio/video content 110 disposition to the advertisement content 120 disposition. One skilled in the art will understand that the advertisement insertion program 222 may store a number of the tables. The following illustrative example of a table is for comparing the disposition of audio/video content 110 to advertisement content 120.

| Audio/Video Content Disposition | Advertisement Content Disposition | | |
|---|---|---|---|
| | Happy | Sad | Indifferent |
| Happy | Accept | Reject | Maybe |
| Sad | Reject | Accept | Maybe |
| Indifferent | Maybe | Maybe | Maybe |

As shown in the table above, when the audio/video content disposition is "Happy", an advertisement content disposition of "Happy" is acceptable, "Sad" is not acceptable, and "Indifferent" will work when there are no acceptable advertisements. When the audio/video content disposition is "Sad", an advertisement content disposition of "Happy" is not acceptable, "Sad" is acceptable, and "Indifferent" will work when there are no acceptable advertisements. When the audio/video content disposition is "Indifferent", an advertisement content disposition of "Happy", "Sad", and "Indifferent" are equally acceptable. One skilled in the art will understand that the disposition value in the advertisement content 120 may differ from the disposition value in the audio/video content 110, as long as a table or similar capability is provided to yield a result for comparing the disposition values. In an illustrative example, a comparison of "Silly" to "Happy" yields a result of "Accept" in a table, while a comparison of "Silly" to "Sad" yields a result of "Reject" in the table.

In a further embodiment, an advertiser may offer a number of versions, or variations, of an advertisement (e.g., a romantic version, a sports-oriented version, a version with silly humor, a version with crude humor, and the like), each with a corresponding disposition value, and the embodiment can be used to select the most acceptable version or variation of the advertisement in the advertisement content 120 for the audio/video content 110.

When the disposition matching finds more than one advertisement that matches, the advertisement insertion program 222 employs a tie-breaking algorithm to determine which advertisement to insert into the audio/video content 110. In one embodiment, the tie-breaking algorithm selects the first advertisement found. In another embodiment, the tie-breaking algorithm selects one of the matching advertisements at random. In yet another embodiment, each advertisement has a rank value determined by a set of criteria (e.g., length of the advertisement, quality of the advertisement, or popularity of the advertisement) and the tie-breaking algorithm selects the advertisement with the highest rank value.

Although the disclosed embodiments describe a fully functioning method implemented in a computer system for inserting advertisements into an audio/video stream, the reader should understand that other equivalent embodiments exist. Since numerous modifications and variations will occur to those reviewing this disclosure, the method implemented in a computer system for inserting advertisements into an audio/video stream is not limited to the exact construction and operation illustrated and disclosed. Accordingly, this disclosure intends all suitable modifications and equivalents to fall within the scope of the claims.

I claim:

1. A computing device, comprising:
a memory device resident in the computing device; and
a processor disposed in communication with the memory device, the processor configured to:
  receive an audio/video stream;
  monitor the audio/video stream;
  detect an advertisement insertion notification for the audio/video stream, the advertisement insertion notification referencing an advertisement insertion point at a position in the audio/video stream;
  determine a disposition of the audio/video stream at the position, the disposition comprising a first indicator of one of a mood and an emotional state associated with the audio/video stream at the position;
  examine at least one advertisement stream to identify a matching advertisement stream having an advertisement disposition that is in agreement with the disposition of the audio/video stream at the position, the advertisement disposition comprising a second indicator of one of a mood and an emotional state associated with the matching advertisement stream, and wherein agreement comprises a predetermined acceptability of the second indicator in relation to the first indicator; and
  insert the matching advertisement stream into the audio/video stream at the position.

2. The computing device of claim 1, wherein to receive the audio/video stream, the processor is further configured to:
retrieve the audio/video stream, and said at least one advertisement stream, from the memory device resident in the computing device.

3. The computing device of claim 1, wherein to determine the disposition, the processor is further configured to:
locate a disposition indicator descriptor for a segment of the audio/video stream at the position; and
retrieve the disposition from the disposition indicator descriptor.

4. The computing device of claim 3, wherein the disposition indicator descriptor is at least one of a field in a program guide associated with the segment of the audio/video stream, and a field in the segment of the audio/video stream.

5. The computing device of claim 1, wherein the disposition and the advertisement disposition each have a discrete value.

6. The computing device of claim 5, wherein the discrete value represents a mood.

7. The computing device of claim 1, wherein to examine said at least one advertisement stream, the processor is further configured to:
determine the advertisement disposition for each advertisement stream;
compare the advertisement disposition for each advertisement stream to the disposition of the audio/video stream at the position; and
select one of said at least one advertisement stream as the matching advertisement stream based on the comparing of the advertisement disposition for each advertisement stream to the disposition of the audio/video stream at the position.

8. The computing device of claim 7, wherein to determine the advertisement disposition, the processor is further configured to:
locate an advertisement disposition indicator descriptor for each advertisement stream; and
retrieve the advertisement disposition from the advertisement disposition indicator descriptor.

9. The computing device of claim 8, wherein the advertisement disposition indicator descriptor is at least one of a field in a program guide associated with each advertisement stream, and a field in each advertisement stream.

10. The computing device of claim 1, wherein the audio/video stream is an MPEG-2 transport stream, and wherein the advertisement insertion notification is a splice point notification.

11. A method implemented in a computer system for inserting advertisements into an audio/video stream, comprising:
receiving the audio/video stream;
monitoring the audio/video stream;
detecting an advertisement insertion notification for the audio/video stream, the advertisement insertion notification referencing an advertisement insertion point at a position in the audio/video stream;
determining a disposition of the audio/video stream at the position, the disposition comprising a first indicator of one of a mood and an emotional state associated with the audio/video stream at the position;
examining at least one advertisement stream to identify a matching advertisement stream having an advertisement disposition that is in agreement with the disposition of the audio/video stream at the position, the advertisement disposition comprising a second indicator of one of a mood and an emotional state associated with the matching advertisement stream, and wherein agreement comprises a predetermined acceptability of the second indicator in relation to the first indicator; and
inserting the matching advertisement stream into the audio/video stream at the position.

12. The method of claim 11, wherein the receiving of the audio/video stream further comprises:

retrieving the audio/video stream, and said at least one advertisement stream, from a memory device resident in the computer system.

13. The method of claim 11, wherein the determining of the disposition further comprises:
locating a disposition indicator descriptor for a segment of the audio/video stream at the position; and
retrieving the disposition from the disposition indicator descriptor.

14. The method of claim 13, wherein the disposition indicator descriptor is at least one of a field in a program guide associated with the segment of the audio/video stream, and a field in the segment of the audio/video stream.

15. The method of claim 11, wherein the disposition and the advertisement disposition each have a discrete value.

16. The method of claim 15, wherein the discrete value represents a mood.

17. The method of claim 11, wherein the examining of said at least one advertisement stream further comprises:
determining the advertisement disposition for each advertisement stream;
comparing the advertisement disposition for each advertisement stream to the disposition of the audio/video stream at the position; and
selecting one of said at least one advertisement stream as the matching advertisement stream based on the comparing of the advertisement disposition for each advertisement stream to the disposition of the audio/video stream at the position.

18. The method of claim 17, wherein the determining of the advertisement disposition further comprises:
locating an advertisement disposition indicator descriptor for each advertisement stream; and
retrieving the advertisement disposition from the advertisement disposition indicator descriptor.

19. The method of claim 18, wherein the advertisement disposition indicator descriptor is at least one of a field in a program guide associated with each advertisement stream, and a field in each advertisement stream.

20. The method of claim 11, wherein the audio/video stream is an MPEG-2 transport stream, and wherein the advertisement insertion notification is a splice point notification.

21. A non-transitory computer-readable medium, comprising computer-executable instructions that, when executed on a computing device, perform steps of:
receiving the audio/video stream;
monitoring the audio/video stream;
detecting an advertisement insertion notification for the audio/video stream, the advertisement insertion notification referencing an advertisement insertion point at a position in the audio/video stream;
determining a disposition of the audio/video stream at the position, the disposition comprising a first indicator of one of a mood and an emotional state associated with the audio/video stream at the position;
examining at least one advertisement stream to identify a matching advertisement stream having an advertisement disposition that is in agreement with the disposition of the audio/video stream at the position, the advertisement disposition comprising a second indicator of one of a mood and an emotional state associated with the matching advertisement stream, and wherein agreement comprises a predetermined acceptability of the second indicator in relation to the first indicator; and
inserting the matching advertisement stream into the audio/video stream at the position.

* * * * *